(12) United States Patent
Elferich et al.

(10) Patent No.: US 8,217,763 B2
(45) Date of Patent: Jul. 10, 2012

(54) LIGHTING DEVICE FOR FLOORS

(75) Inventors: Reinhold Elferich, Aachen (DE); Achim Hilgers, Alsdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 493 days.

(21) Appl. No.: 12/514,463

(22) PCT Filed: Nov. 8, 2007

(86) PCT No.: PCT/IB2007/054546
§ 371 (c)(1),
(2), (4) Date: May 12, 2009

(87) PCT Pub. No.: WO2008/059412
PCT Pub. Date: May 22, 2008

(65) Prior Publication Data
US 2010/0052866 A1    Mar. 4, 2010

(30) Foreign Application Priority Data
Nov. 17, 2006   (EP) ..................... 06124279

(51) Int. Cl.
*G08B 21/00*  (2006.01)
(52) U.S. Cl. ................. 340/10.5; 340/815.4; 340/691.1; 362/153
(58) Field of Classification Search ............... 340/540, 340/10.5, 815.4, 332, 691.1; 362/153, 153.1
See application file for complete search history.

(56) References Cited

U.S. PATENT DOCUMENTS

| | | | |
|---|---|---|---|
| 3,017,497 | A | 1/1962 | Albright |
| 4,544,993 | A | 10/1985 | Kirk |
| 4,737,764 | A | 4/1988 | Harrison |
| 6,354,714 | B1 | 3/2002 | Rhodes |
| 6,603,082 | B1 | 8/2003 | Delbruck et al. |
| 6,982,649 | B2 | 1/2006 | Blum et al. |
| 2003/0025609 | A1 | 2/2003 | Curwen et al. |
| 2004/0065813 | A1 | 4/2004 | Goldstein |
| 2004/0114355 | A1 | 6/2004 | Rizkin et al. |
| 2005/0168984 | A1 | 8/2005 | Ossevoort et al. |
| 2006/0043912 | A1 | 3/2006 | Foust et al. |
| 2006/0049955 | A1 | 3/2006 | Blum et al. |

FOREIGN PATENT DOCUMENTS

| | | |
|---|---|---|
| EP | 1400878 A1 | 3/2004 |
| GB | 2407633 A | 5/2005 |
| WO | 0063730 A1 | 10/2000 |
| WO | 2005107337 A1 | 11/2005 |
| WO | 2006044902 A2 | 4/2006 |

*Primary Examiner* — Jeffery Hofsass
(74) *Attorney, Agent, or Firm* — Mark L. Beloborodov

(57) ABSTRACT

The invention relates to a lighting device, particularly a lighting tile (100, 100') for paving e.g. a floor area (1), comprising a light emitting unit and an associated control unit. The control unit is adapted to detect the presence of a first nearby object (3) and to receive wireless signals from a second nearby object, for example from an RFID-tag (2) and/or an NFC-based device, carried by the first object (3). The lighting device may for instance be used in a method for guiding passengers through a public space like an airport.

13 Claims, 4 Drawing Sheets

LIGHTING DEVICE FOR FLOORS

The invention relates to a lighting device comprising a light emitting unit and an associated control unit that allows the detection of nearby objects. Moreover, it relates to a traffic control system comprising such a lighting device and to a method for controlling an object carrying a wireless communication device like an RFID-tag and/or an NFC-based device.

A floor tile that comprises a light emitting unit and a pressure sensor is disclosed in the U.S. Pat. No. 6,603,082 B1. When the pressure sensor detects a person stepping onto the tile, it can start an interaction procedure comprising the activation of the light emitting unit as well as a communication with neighboring tiles. Thus pedestrians can for example be selectively guided for distributing their flow evenly through several equivalent passageways.

Based on this situation it was an object of the present invention to provide a lighting device with additional functionalities.

This object is achieved by a lighting device according to claim 1, a traffic control system according to claim 9, and a method according to claim 10. Preferred embodiments are disclosed in the dependent claims.

The lighting device according to the present invention comprises a light emitting unit for controlledly emitting light which can for example code some information and/or simply illuminate a region. The lighting unit may comprise one or more individual light emitters, for example in the form of a light emitting diode (LED), phosphor converted LED, organic LED (OLED), LASER, phosphor converted LASER, colored fluorescent lamp, filtered (colored) halogen lamp, filtered (colored) high intensity discharge (HID) lamp, and/or filtered (colored) UHP lamp. Moreover, the lighting device comprises an associated control unit that controls the activity (on, off, brightness, color, spatial activation pattern etc.) of the lighting unit. Said control unit comprises the following components:

a) A sensor module for detecting the presence of a first nearby object, for example of a person. The distance at which the object is detected as being "nearby" may depend on the underlying application and lies typically in the range of the diameter of the lighting device; in typical embodiments, the object will have to touch the sensor module for being detected.
  b) A receiver module for receiving wireless signals from a second nearby object. Said second object may in principle be identical to the first object which is detected by the sensor module. Typically, the second object will however be some special device, for example an RFID-tag and/or an NFC-based device, that is carried by the first object. The distance at which the second object is considered as being "nearby" usually corresponds to the distance at which the first object is "nearby"; it is of course limited by the range of the wireless communication between the second object and the receiver module.

In contrast to known tactile lighting devices that react to the presence of a nearby (first) object, the proposed lighting device additionally allows to receive data from a nearby second object. These data can for example be used to verify the result of the sensor detection, or to identify the (second and/or first) object. Identification of the object allows the control unit to initiate object-specific procedures, e.g. to mark allowed and forbidden areas by corresponding lights or to guide a passenger to a desired destination.

The receiver module of the lighting device may continuously be active or "awake" to receive wireless signals from a possible (second) nearby object, or it may be activated intermittently with some frequency (e.g. 0.1 to 10 Hz). In a preferred embodiment, the control unit is adapted to activate the receiver module if the sensor module has detected the presence of a first nearby object. This is particularly useful if the first nearby object is associated to (and shall be identified via) a second nearby object. Such a case-sensitive activation may be the only way the receiver module is activated, or it may be applied additionally to other activation schemes.

In a preferred embodiment of the lighting device, the receiver module is able to determine the strength of the wireless signals received from a second nearby object. If a plurality of lighting devices is used, a comparison between the strengths of the signals received by their receiver modules will then allow to locate the second object relative to the lighting devices. If crucial operating parameters like the strength of the transmitter in the second object are known, it will even be possible to infer the absolute distance between the second nearby object and the receiver module.

Up to now it was only assumed that the receiver module can receive wireless signals. In a preferred embodiment, the receiver module will however also comprises a transmitter for transmitting wireless signals to e.g. a second nearby object. This allows a bi-directional communication with the second object, which can optionally be used to initiate a communication by the receiving unit. Thus it is for example possible to actively interrogate the identity of an RFID-tag and/or an NFC-based device if the presence of a (first) nearby object has been detected by the sensor module.

As was already mentioned, the second object may particularly comprise a Radio-Frequency-Identification transponder ("RFID-tag") and/or a device able to communicate by means of Near Field Communication (NFC) principles such as e.g. a modern mobile phone, i.e. the receiver module may be adapted to communicate with such a device. RFID technology is gaining increasing importance in many applications, and corresponding devices (transponders, readers) are becoming readily available at low costs. Many objects will therefore in future be equipped with RFID-tags such that this technology can be used with no or only little extra costs. NFC-technology is for example specified in ISO 18092, ECMA 340, and ETSI TS 102 and typically operates at a frequency of about 13.56 MHz with a limited range of about 20 cm. It is already used in public transportation and portable devices such as mobile phones, PDAs, etc. NFC can be used as stand-alone identification/permission check or in combination with RFID-technology.

The sensor module of the control unit may be based on any suited technology that allows the detection of a first nearby object. In particular, the sensor module may comprise a pressure sensor for detecting the weight of an object touching it, a capacitive sensor for detecting changes in the electrical capacitance caused by the presence of an object, an inductive sensor for detecting changes in the electrical inductance caused by the presence of an object, or an optical sensor that detects optical changes caused by an object (for example in the light transmittance or reflectance).

The lighting device may optionally comprise a memory unit for storing information related to the history of interactions with nearby objects, i.e. the history of sensor detections of nearby first objects and the history of wireless communications with nearby second objects. Said information may for example represent the time that passed since the last detection of an object, or a (moving) average number of object detections. The light emitting unit may then be controlled according to the stored information, for example by assuming a brightness or color that changes proportional to the time duration since the last interaction with an object.

According to another embodiment of the invention, the control unit may assume a programming mode in which its "normal" operation mode can be altered dependent on an interaction (i.e. a detection or wireless data communication) with a nearby (first or second) object. The active operation mode of the control unit may optionally be determined by an internal state variable that is stored in a memory unit. One application of this embodiment is for example the programming of traces into an array of lighting devices on a floor by simply walking over it during the programming mode. The programming mode may for instance be initiated by an external command, by identifying a particular second object by the receiver module, by detecting a particular pattern by the sensor module (e.g. a number of rapidly following contacts with a first object) or the like.

The light emitting unit may preferably be designed such that it can be activated by the control unit in illumination states having different light intensities and/or different light colors. Such different illumination states can for example be used to adapt the light intensity to the required illumination level or to encode information for a user. The light emitting unit may particularly comprise at least two light emitters (e.g. LEDs of different colors) that can selectively be activated separately or simultaneously.

The control unit may optionally comprise at least one communication interface to external components. This link can for example be used to put the lighting device into the previously mentioned programming mode, to communicate information from the control unit to some central data processing unit for further evaluation, or to control the lighting unit from the outside. The communication interface may preferably be bidirectional to allow a coupling with similar lighting devices and/or to an external component that is shared by several similar lighting devices. In this case an array of identical or similar lighting devices can be constructed which can react to the presence of objects in a coordinated way.

The lighting device is preferably shaped as a tile that can be put together with corresponding tiles to fill a certain area in a substantially gapless way. In a simple case, the shape of said tile is rectangular or hexagonal. More complicated shapes are however possible, too, including the case that a set of several different shapes is needed to fill an area without gaps.

The invention further relates to a traffic control system that comprises at least one lighting device of the kind described above (i.e. a lighting device with a light emitting unit and an associated control unit that comprises a sensor module and a receiver module) and at least one wireless communication device, particularly an RFID-tag and/or an NFC-based device, that is compatible with the receiver module of the lighting device. For more information on the details, advantages and improvements of that traffic control system, reference is made to the preceding description of the lighting device.

Moreover, the invention relates to a method for controlling an object carrying wireless communication device, particularly an RFID-tag and/or an NFC-based device, in an area, comprising a) detecting the presence of the object at at least one detection site in the area;
b) identifying the object with the help of its wireless communication device;
c) changing the state of at least one lighting unit (e.g. switching it on or off or changing its brightness or color) in dependence on the identity of the object and on the detection site where it was detected.

The traffic control system and the aforementioned method realize a particular application of a lighting device of the kind described above, wherein objects are localized in an area with the help of sensors and identified with the help of an RFID-tag. The lighting units are then activated in dependence on the determined location and identity of the object, for example in a direction in which a certain passenger has to go to reach a certain individual destination. Moreover, the lighting units may for example signal an alarm if an unauthorized person is detected in a critical zone.

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figures to identical or similar components.

Figure 1:
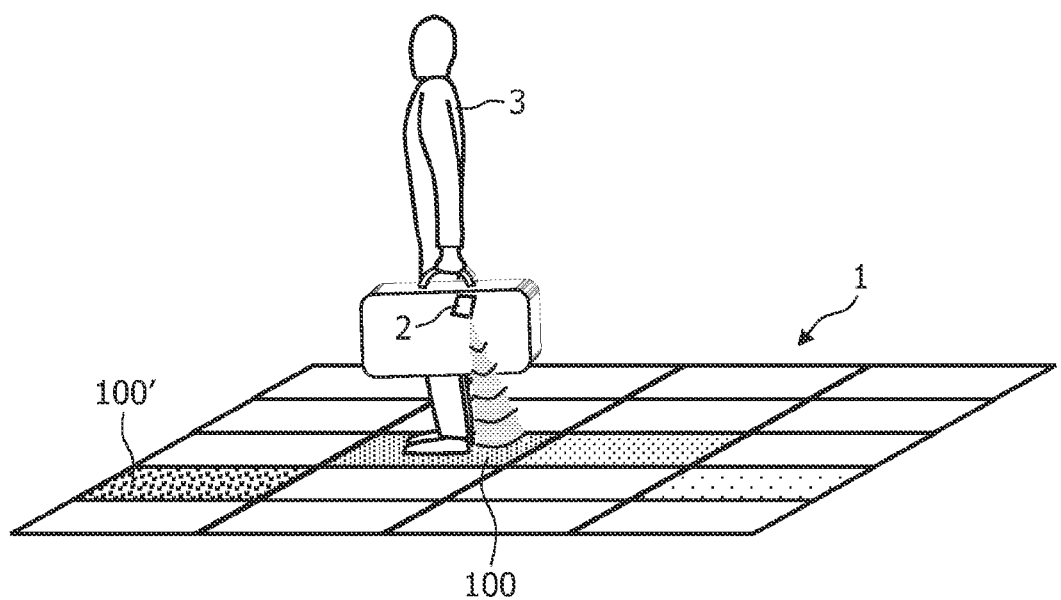
FIG. 1 shows schematically a perspective view of a floor area with lighting tiles according to the present invention.

A lighting device according to the present invention will in the following be described with respect to a particular realization as a lighting tile that can be used for paving a floor, a wall, a ceiling or the like. FIG. 1 shows in this respect a floor area 1 that is paved with identical rectangular (or differently shaped) lighting tiles 100 according to the present invention. As will be described in more detail below, said tiles 100 are activated (i.e. their light emission is switched on) by loading them with a weight, e.g. when a pedestrian 3 steps onto them.

The tiles 100 are preferably able to assume different states of illumination, e.g. with different light intensities or different colors. This capability can for example be used to change the state of illumination according to the time that passed since the last time a person stepped onto a tile. As indicated in FIG. 1, the trace of a person 3 walking over the floor 1 can thus for example gradually fade out. It should however be noted that the action that is initiated by the detection of a weight on a tile 100 is not limited to switching the corresponding lighting unit on, but may also or alternatively comprise switching off of an active lighting unit or changing its color or intensity. Further examples of procedures that may be initiated by a detected weight can for example be found in the U.S. Pat. No. 6,603,082 B1.

FIG. 1 further indicates that the pedestrian 3 carries a suitcase with an RFID-tag 2, wherein said tag is identified via a wireless communication with the corresponding tile 100. Thus a "first object" (pedestrian 3) is detected via its weight, while a "second object" (RFID-tag 2) is identified via a wireless data transmission. This allows the system to discriminate between different objects and to show individual responses to each of them.

In one particular application of the described system, a passenger 3 in a public place like a railway station, an airport, a store, a hotel, an office or the like may be individually guided to his or her destination (e.g. a certain platform, gate, product, room etc.). Such a guidance may for example be achieved by highlighting those tiles 100' the passenger 3 has to step on next, wherein different colors may be used to indicate the paths of different persons and/or the paths to different destinations.

In another application of the described system, the floor 1 of lighting tiles 100 may be used to detect the presence of unauthorized persons (i.e. persons without the right RFID-tag) and to initiate a corresponding alarm, e.g. by flashing the tiles around said person.

Figure 2:
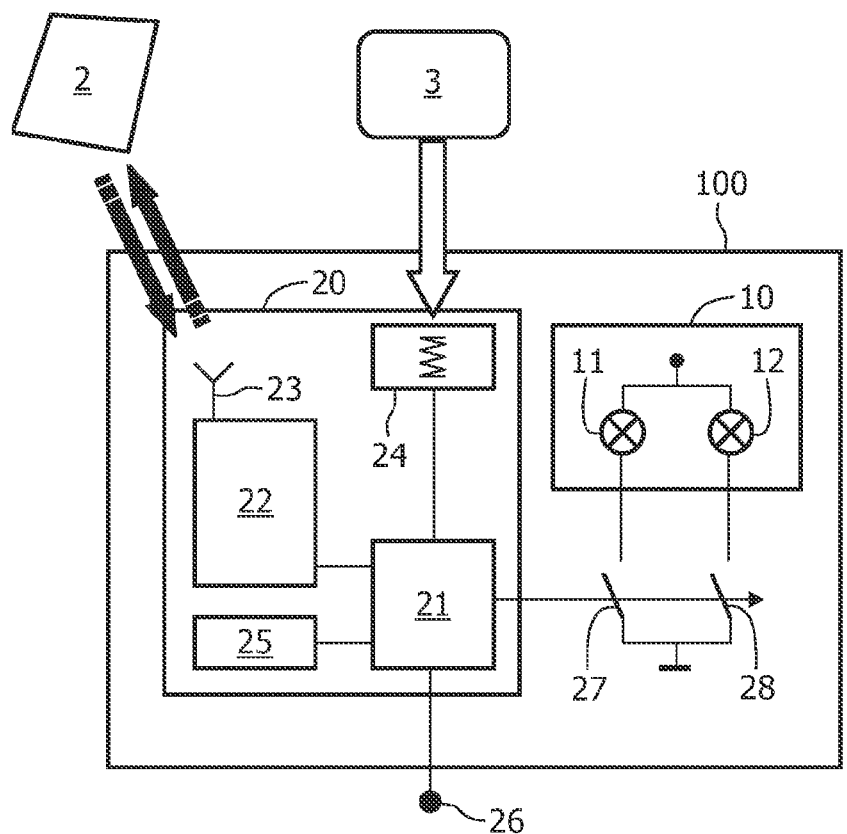
FIG. 2 shows schematically the layout of a lighting tile according to the present invention.

FIG. 2 shows schematically one possible layout of a lighting tile 100 according to the present invention. Said tile 100 comprises a light emitting unit 10 which contains two light emitting diodes 11, 12 of different colors, particularly OLEDs. The light emitting diodes 11, 12 are selectively switched on or off by a driver 21 of a control unit 20 that sets the closing state of two switches 27 and 28.

The control unit 20 further comprises a sensor unit 24 coupled to the driver 21 that can detect the presence of a nearby object 3. Various detection principles can be used for this purpose, for example:

- The evaluation of a pressure signal. This evaluation can be achieved with extra sensing means, or, if the lighting unit 10 comprises OLEDs 11, 12, via a variation of their intrinsic capacity.
- The evaluation of a common mode capacitance (to ambient).
- The evaluation of an inductive proximity effect.
- The sensing of a change in light reflected onto the tile 100.

The driver 21 is further coupled to a receiver module 22. With its antenna 23, the receiver module 22 can establish a wireless (uni- or bi-directional) communication to an external RFID-tag 2. Depending on the result of an identification procedure (including the case that no identification was possible), the operating mode of the control unit 20 can change.

The control unit 20 further comprises a memory unit 25, e.g. a RAM, ROM, EPROM or the like. Said memory unit 25 can be used to store an internal state variable, information about valid IDs, and/or information related to the detection history of the tile 100.

Finally, the control unit 20 comprises a communication interface 26 via which it can exchange information with neighboring tiles and/or a central host computer. Thus neighboring tiles can for example be informed if an object is detected by the sensor unit 24 and/or identified by the receiver 22, and the reactions of the tiles can be coordinated (as is the case for the highlighted tile 100' in FIG. 1).

With the described design of a lighting tile, various procedures can be triggered by the detection and/or identification of an object, for example:

- The lighting unit 10 and/or those of surrounding tiles are switched on, switched off, or change their brightness.
- The lighting unit 10 and/or those of surrounding tiles change their color.
- The illumination state is manipulated in the aforementioned manners as long as the sensor unit 24 detects an object 3.
- The illumination state is held after the sensor unit 24 has detected an object 3 and turned back to a predefined function after a predetermined duration (footmark).
- The illumination state represents a moving average of object detection events.
- A programming or "write mode" can be established, in which programmable traces can be "written" by walking over the tiles.
- The tile state can indicate "forbidden areas".
- In combination with RFID and/or an NFC-based device, the tile state can indicate e.g. unauthorized persons or luggage or unpaid goods in a store.

It should be noted that the above list of possible procedures is far from complete. The proposed lighting tiles 100 can for example be applied in stores, hotels, airports, railway stations, leisure parks, public buildings, office buildings etc. for decorative purposes, customer guidance, safety inspection support, marketing, comfort or amusement. Moreover, they can support statistics about 'preferred customers places' in a store.

Figure 3:
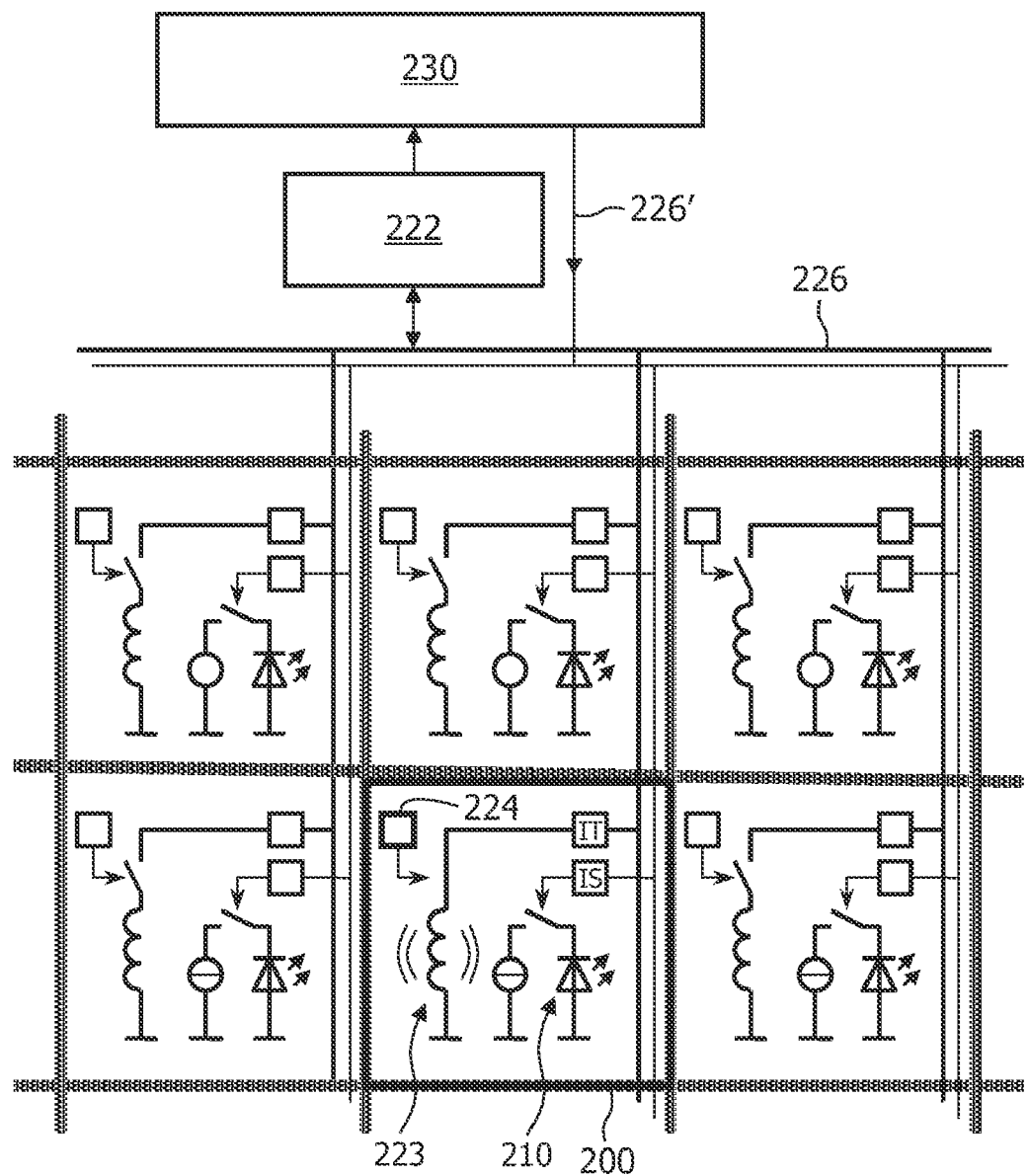
FIG. 3 shows schematically the layout of a plurality of lighting devices that are coupled to an external reader and controller.

FIG. 3 schematically shows a further particular embodiment of a floor lighting system. It consists of a central controlling means 230 (e.g. a microcomputer), one or more RFID base stations 222, a multitude of similar lighting tiles 200, and mobile labels (not shown) carried by persons or mobile objects.

The tiles 200 comprise controllable luminaries 210, antennas 223, tread sensors 224, switches, and local controllers. A sensor 224 can detect the presence of a person/object on or immediately above the tile. This event activates (as shown in the tile that is encircled in bold) the antenna 223 to radiate an RF signal in order to detect any label in its range. The range of standard 13 MHz systems is for example about 1 m.

An RF reader associated to the antenna 223 could be installed within each tile 200. In the shown embodiment, a RF reader base station 222 is instead shared by a group of tiles to save costs. In this case only the antennas 223 are installed locally and connected to the RF reader 222 via impedance transformers IT and lines 226. If the reader 222 is not individually connected to each tile 200, means like a multiplexer should be present to establish a unique (and identifiable) coupling between the reader 222 and each tile.

Data resulting from the RFID action is further made available to the host controller 230, which in turn processes the illumination state of the trodden tile. The result of this processing is either transferred via an extra signal path 226' or via the RF path 226. It will activate a local driver IS that powers the lamps 210 in the paving tile 200 in order to keep/change the brightness/color of that tile.

Instead of using RFID technology, capacitive based identification systems might be used, e.g. PAN ("Personal (body/human) Area Network") in which the body or skin is used as a transmission medium (cf. the Skinplex® application of Ident Technology, Wessling, Germany). The advantage here is firstly, in case of persons, that the reach can be well controlled regarding the distance tile-to-person, since the body itself is made part of the transponder media. Secondly, such system could be well combined with a certain kind of sensor, namely a capacitance detector (as further described in connection with FIG. 5). However, compared to RFID, PAN always requires active devices.

Figure 4:
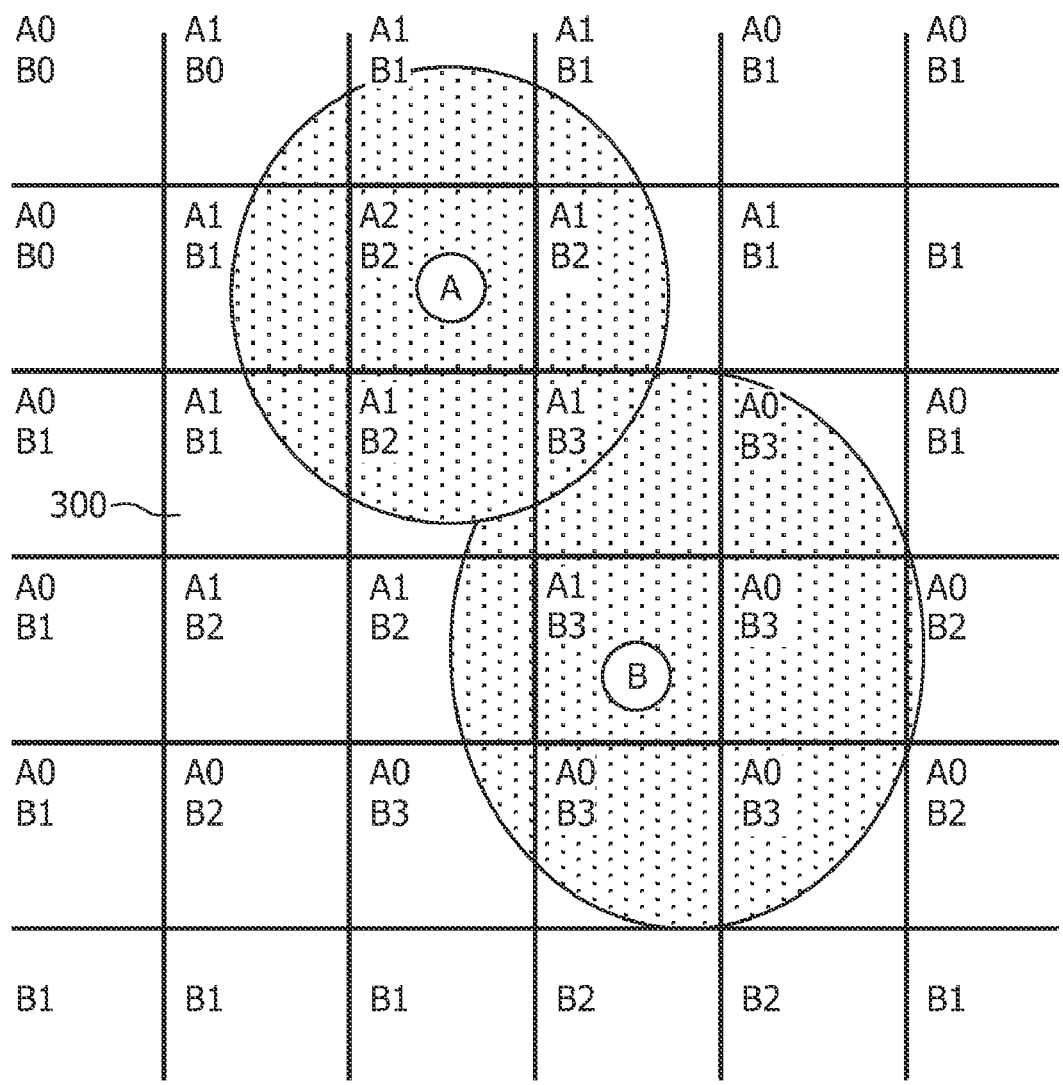
FIG. 4 illustrates the principle of locating an object by evaluating the strengths of wireless signals.

FIG. 4 deals with a confined algorithm that allows for an improved mapping of tread event and label-carrier on a floor of lighting tiles 300 (e.g. tiles according to FIG. 2 or 3). Even if the reaching area of the antennas in the floor tiles is approximately constant, the received signal will strongly depend on the person who carries the label and where or how the label is carried. The Figure illustrates such a situation with two persons A and B on the floor. The figures in the left upper corners of the paving tiles 300 indicate the signal strengths that would be received by the RF reading means if the corresponding antennas were activated.

The antenna in the tile on which person A stands receives for example RF data from person A with a (high) strength A2. However, it also receives RF signals from person B with a (similar) strength B2. In order to overcome this ambiguity, two measures can be taken: Firstly, after a tread event not only the antenna in the trodden tile but also the surrounding antennas are activated, resulting in a kind of probability distribution area that can be evaluated in a central controller (not shown). Secondly, the controller can correlate these areas with the tread events to reveal the correct assignment between measured RF signals and object A or B. This approach even allows detecting e.g. that a person does not carry a label.

Regarding the communication structure, inter-tile communication can also be introduced, e.g. in order to directly activate the antennas of surrounding tiles after a tread event.

Figure 5:
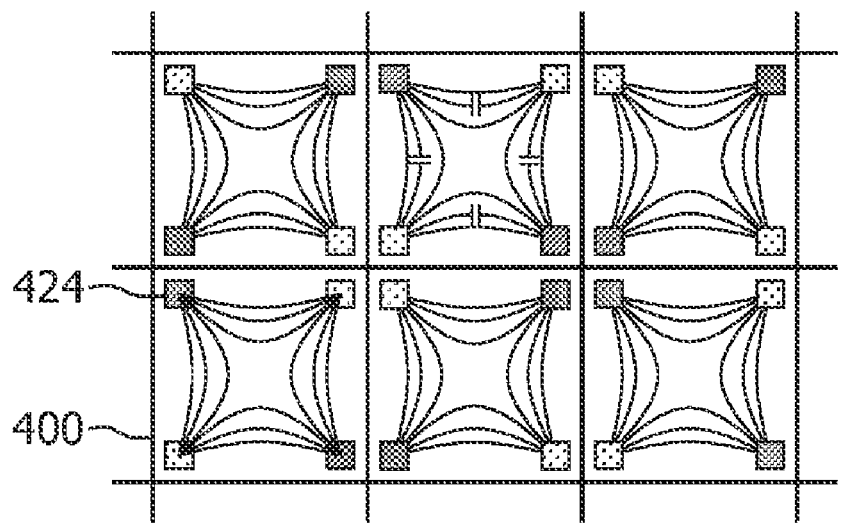
FIG. 5 shows an example of lighting devices with capacitive sensor modules.

FIG. 5 shows a particular sensor arrangement in tiles 400 to detect a tread event or more generally the presence of a person or object on or above a tile. On or underneath the surface of the tiles 400, there are several electrodes 424, which form one or more capacitors. These capacitors are exemplarily indicated by a symbol in the upper central tile for a setup in which one electrode is located in each corner and the same potential is applied to diagonally arranged electrodes. The capacitance depends on the permittivity or conductivity of the matter above the electrodes. Any change of capacitance can then be evaluated e.g. in a resonant circuit. The Figure shows an arrangement particularly meant to decouple the sensing of neighboring tiles.

Figure 6:
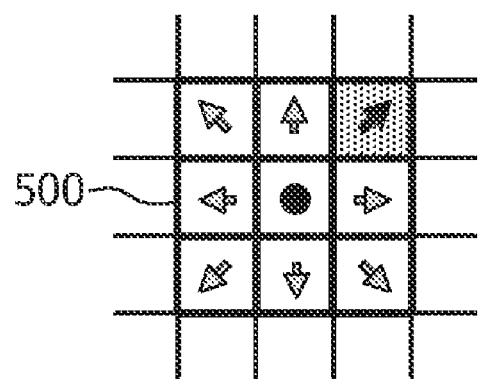
FIG. 6 illustrates the guidance of a passenger with lighting devices.

FIG. 6 illustrates a specific guidance application. Here, not the complete floor is covered with lighting tiles, but only a certain, small area consisting of a few tiles 500. If a person goes to the central tile, the system can indicate the direction to go by illuminating e.g. the appropriate tile of the eight neighbors. The system may further detect a label carried by the person, e.g. integrated in a ticket or hotel key, and the direction may refer e.g. to the appropriate check-in desk or hotel room.

Besides illuminating a whole tile, only the sides, an edge, or some other pattern on the tiles or the seams between the tiles may be illuminated.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A lighting tile suitable for paving a floor, comprising:
   a light emitting unit;
   a sensor module for detecting a first nearby object;
   a receiver module for receiving a wireless signal from a second nearby object; and
   a control unit in communication with the sensor module and the receiver module for controlling the light emitting unit in response to both detecting the first nearby object and receiving the wireless signal.

2. The lighting tile of claim 1, wherein the control unit activates the receiver module upon detecting the first nearby object.

3. The lighting tile of claim 1, wherein the control unit controls the light emitting unit based on a strength of the wireless signal.

4. The lighting tile of claim 1, wherein the control unit controls the light emitting unit based on an identity provided by the wireless signal.

5. The lighting tile of claim 1, further comprising:
   a transmitter for transmitting wireless signals to the second nearby object.

6. The lighting tile of claim 1, wherein the second nearby object comprises a wireless communication device.

7. The lighting tile of claim 1, wherein the second nearby object comprises an RFID-tag or an NFC-based device.

8. The lighting tile of claim 1, wherein the sensor module comprises at least one of a pressure sensor, a capacitive sensor, an inductive sensor, or an optical sensor.

9. The lighting tile of claim 1, wherein an operational mode of the controlled unit is controlled by the second nearby object.

10. The lighting tile of claim 1, wherein an operational mode of the controlled unit is controlled by the second nearby object.

11. The lighting tile of claim 1, wherein the first nearby object is a human being.

12. The lighting tile of claim 1, wherein the sensor module and the receiver module are implemented as part of the control unit.

13. A two-dimensional array of lighting tiles, each lighting tile comprising:
    a light emitting unit;
    a sensor module for detecting a first nearby object;
    a receiver module for receiving a wireless signal from a second nearby object; and
    a control unit for controlling the light emitting unit of at least one another lighting tile of the array in response to both detecting the first nearby object and receiving the wireless signal.

* * * * *